United States Patent [19]

Sugiyama

[11] Patent Number: 4,510,531
[45] Date of Patent: Apr. 9, 1985

[54] ROTARY RECORDING MEDIUM AND REPRODUCING APPARATUS THEREOF

[75] Inventor: Hiroyuki Sugiyama, Isehara, Japan

[73] Assignee: Victor Company of Japan, Ltd., Yokohama, Japan

[21] Appl. No.: 398,230

[22] Filed: Jul. 14, 1982

[30] Foreign Application Priority Data

Jul. 15, 1981 [JP] Japan .................. 56-110586

[51] Int. Cl.³ .............................. H04N 5/76
[52] U.S. Cl. ................... 358/342; 358/907; 358/341; 358/343; 360/10.1; 360/19.1
[58] Field of Search ............... 358/312, 313, 335, 342, 358/907, 341, 343; 360/10.1, 19.1; 369/47

[56] References Cited

U.S. PATENT DOCUMENTS

| | | | |
|---|---|---|---|
| 3,829,610 | 8/1974 | Meeussen et al. | 360/10.1 X |
| 3,878,560 | 4/1975 | Ramage | 360/19.1 X |
| 4,065,795 | 12/1977 | Shutterly | 360/19.1 X |
| 4,135,205 | 1/1979 | Takahashi | 360/19.1 X |
| 4,317,131 | 2/1982 | Jerome | 358/342 |
| 4,439,791 | 3/1984 | Hirata | 358/342 |

FOREIGN PATENT DOCUMENTS

| | | |
|---|---|---|
| 2621995 | 5/1976 | Fed. Rep. of Germany . |
| 1519974 | 8/1975 | United Kingdom . |
| 2016785A | 9/1979 | United Kingdom . |
| 1563680 | 3/1980 | United Kingdom . |
| 2082823A | 3/1982 | United Kingdom . |
| 2087130A | 5/1982 | United Kingdom . |
| 2086083A | 5/1982 | United Kingdom . |
| 2099202A | 12/1982 | United Kingdom . |
| 2105491A | 3/1983 | United Kingdom . |

Primary Examiner—Robert L. Richardson
Attorney, Agent, or Firm—Louis Bernat

[57] ABSTRACT

A rotary recording medium to be reproduced by a reproducing apparatus having a reproducing element, has a spiral track consisting of plural track turns on which a video signal and an audio signal have been recorded, and a plurality of same units of the video signal are recorded in each of the track turns, and an instruction signal having an information for instructing a shift of the reproducing element from a track to another track turn is recorded in a vertical blanking interval of the video signal with a predetermined field period according to a kind of the video signal program source, where the audio signal consists of divided audio signals in which a continuous audio signal is divided in every interval of field period of the video signal to be reproduced. A reproducing apparatus for reproducing this rotary recording medium comprises a detecting circuit for detecting the instruction signal from among signals reproduced by the reproducing element, a kick pulse generator for generating a kick pulse responsive to the instruction signal supplied from the detecting circuit, and a switch for selectively supplying the output signal of the detecting circuit in a normal reproduction mode and supplying a still picture reproduction mode signal in a still picture reproduction mode to the kick pulse generator.

6 Claims, 8 Drawing Figures

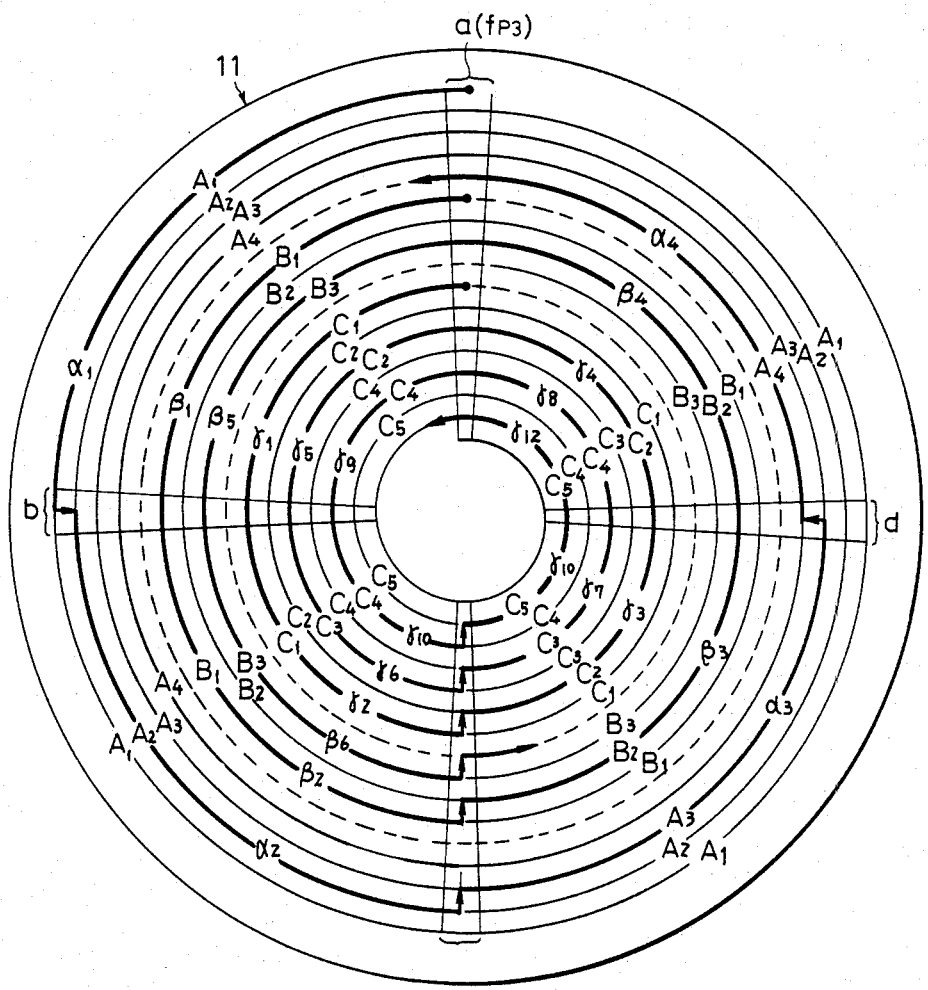

ROTARY RECORDING MEDIUM AND REPRODUCING APPARATUS THEREOF

BACKGROUND OF THE INVENTION

The present invention generally relates to rotary recording mediums and reproducing apparatuses therefor, and more particularly to a rotary recording medium from which a fine still picture reproduction and normal reproduction can be performed selectively, and in which a scanning locus of a pickup reproducing element upon normal reproduction is unitarily determined so that normal reproduction can be performed accurately with respect to a desired track, and a reproducing apparatus for reproducing such rotary recording medium.

An information signal recording and reproducing system has been previously proposed in which the recording system forms pits in accordance with the information signal to record the information signal along a spiral track on a flat rotary recording medium (hereinafter simply referred to as a disc), without forming a groove therein. In the reproducing system, a reproducing stylus traces over along this track to reproduce the recorded information signal in response to variations in the electrostatic capacitance formed between a reproducing stylus and the disc.

In this previously proposed system, since no grooves are provided on the disc for guiding the reproducing stylus, it becomes necessary to record pilot or reference signals on or in the vicinity of a track of the information signal such as a video signal, on the disc. Upon reproduction, the reference signals are reproduced together with the video signal. Tracking control is carried out so that the reproducing stylus accurately traces along the track in response to the reproduced reference signals.

By use of this previously proposed system, there is no possibility whatsoever of the reproducing stylus or the disc being damaged, since the recording track has no groove. The reproducing stylus can trace the same portion of the track repeatedly many times, whereby a special reproduction such as still, slow-motion, or quick-motion picture reproduction becomes possible.

In the above type of a disc, a standard is set for the above proposed system so that four fields of video signal is recorded for one track turn of the disc. This standard was set in order to increase the recording capacity under the restricting conditions introduced by the practical diameter and rotational speed of the disc, the relative linear speed between the reproducing stylus and the disc for obtaining a fine signal-to-noise (S/N) ratio, and the like.

When a still picture reproduction is performed with the above disc, the same track turn is reproduced repeatedly. Accordingly, the video signal of four fields is repeatedly reproduced in this case, to perform the still picture reproduction. However, if the picture content of the video signal which is to be reproduced is a moving picture, the picture recorded in one track turn becomes different in each of the four fields. As a result, the picture obtained by the above still picture reproduction is not completely still, and the picture appears to undergo a reciprocating movement. Hence, as the movement in the above moving picture becomes faster, the reciprocating movement in the still picture reproduction picture increases. Therefore, there is a disadvantage in that the still picture reproduction picture does not appear still, and is unpleasant to watch.

On the other hand, another system may be considered wherein the same video information content is repeatedly recorded in four fields in one track turn, and the still reproduction is performed by repeatedly reproducing the same one track turn. In this case, even if the same one track turn is repeatedly reproduced, the still picture reproduction picture is completely still, because only the same video information content is repeatedly reproduced from the four fields constituting the above one track turn.

If the above disc is repeatedly recorded with the video information of the first field throughout the four fields in the first track turn, repeatedly recorded with the video information of the fifth field throughout the four fields in the succeeding track turn, and thereafter similarly repeatedly recorded with the same video information throughout the four fields in one track turn, the still picture reproduction picture obtained is completely still. However, because ¾ of the video information is missing, there is a disadvantage in that the movement in the reproduced picture is not smooth upon normal reproduction.

On the other hand, the disc may be repeatedly recorded with the video information of the first field throughout the four fields in the first track turn, repeatedly recorded with the video information of the second field throughout the four fields in the succeeding track turn, and thereafter similarly repeatedly recorded with video information of each field throughout the four fields in one track turn without missing any video information. When reproducing such a disc, a complete still reproduction picture can be obtained. However, upon normal reproduction, the video information in each field is reproduced four times, and the reproduced picture becomes a slow-motion reproduction picture. Moreover, in discs capable of providing complete still reproduction picture, there is a disadvantage in that a normal audio signal cannot be obtained.

In order to overcome the above described problems, a disc and reproducing apparatus therefor was proposed in a U.S. patent application entitled "ROTARY RECORDING MEDIUM AND REPRODUCING APPARATUS THEREFOR" in which the assignee is the same as that of the present application. In this proposed disc and reproducing apparatus, the disc is repeatedly recorded with a video signal of the same unit for a plurality of field periods in each track turn, and divided audio signal parts obtained by dividing an audio signal in units of field periods of the video signal which is to be reproduced are successively arranged and recorded on a recording track of the video signal according to a tracing locus of a reproducing element on the disc upon normal reproduction during which change of track is performed by forcibly shifting the reproducing element at least once or a plurality of times for two revolution periods of the disc. Thus, the disc reproducing apparatus can obtain a complete still reproduction picture by repeatedly reproducing the video signal of the same unit in one track turn upon still picture reproduction. Upon normal reproduction, fine normal reproduction picture and reproduced normal audio signal can be obtained, by forcibly shifting the reproducing element to another track at a predetermined position on the disc.

However, the reproducing element may be forcibly shifted to another track at a position other than the original shifting position upon normal reproduction. In such a case, the normal reproduction picture and the reproduced normal audio signal are poorly obtained.

Furthermore, the video signal recorded on one recording surface of the disc is usually not from the same kind of video signal source. That is, a video signal from another kind of video signal source is often mixed into the video signal from one video signal source. For example, when recording an educational program, the picture corresponding to a part where a teacher and the like comments, is obtained from a reproduced video signal from a magnetic recording and reproducing apparatus. On the other hand, the picture corresponding to a part where the comments are finished and the contents are described concretely, is obtained from a video signal from a movie film, for example. In this case, the recording method for the video signal which is normally reproduced, differs according to the video signal source. Hence, it becomes necessary to change the scanning locus of the reproducing element according to the kind of video signal source. However, it is difficult to cause the reproducing element to scan over a scanning locus in accordance with the video signal source, without specific information thereof.

The disc may be recorded with a video information on one recording surface, where the video information time serially composed of two different video information. One video information may be a video information to be reproduced with a picture arbitrarily selected from a still reproduction picture and a normal reproduction picture, and the other video information may be a video information to be reproduced only as a normal reproduction picture. For example, in a program containing a golf tournament, the picture corresponding to the part where the player makes a shot is a video information which can be either obtained as a still reproduction picture or a normal reproduction picture, and accordingly reproduced with the arbitrarily selected picture from the still reproduction picture and the normal reproduction picture. On the other hand, the picture corresponding to a part where the player walks to his golf ball need not be reproduced as a still picture, and thus is a video information which is to be obtained only as a normal reproduction picture. When reproducing such a disc, it is highly desirable to obtain a normal reproduction picture in which the movements are natural. This may be realized if the reproducing apparatus can automatically discriminate the tracks recorded with the video information which is to be obtained as either one of the selected still reproduction picture and the normal reproduction picture, and the tracks recorded with the video information which is to be obtained only as the normal reproduction picture.

SUMMARY OF THE INVENTION

Accordingly, it is a general object of the present invention to provide a novel and useful rotary recording medium and reproducing apparatus therefor, in which the above described problems have been eliminated and the above demands have been satisfied.

Another and more specific object of the present invention is to provide a rotary recording medium in which, a video signal of the same unit for a plurality of field periods is repeatedly recorded in each track turn, an instruction signal for instructing a reproducing element to be forcibly shifted to another track in order to obtain a normal reproduction picture is recorded within a vertical blanking period of the recorded video signal, and each divided audio signal part obtained by dividing an audio signal into field periods of the recorded video signal is successively arranged and recorded on the recording track of the video signal according to a scanning locus of the reproducing element upon normal reproduction, on a track part constituting a portion on the entire recording surface of the rotary recording medium. According to the rotary recording medium of the present invention, a complete still reproduction picture, normal reproduction picture, and reproduced normal audio signal can be obtained selectively. Moreover, the scanning locus of the reproducing element when obtaining a normal reproduction picture by forcibly shifting the reproducing element to another track, is unitarily determined. Thus, a normal reproduction picture and reproduced normal audio signal can be obtained accurately, even from a rotary recording medium in which the still picture recording tracks are scattered on the same recording surface of the rotary recording medium.

Still another object of the present invention is to provide a rotary recording medium in which the above instruction signal is recorded with a predetermined field period according to the kind of video signal source of the video signal which is recorded. According to the rotary recording medium of the present invention, the normal reproduction picture can be obtained accurately, even if video signals from various video signal sources exist together on the same recording surface of the rotary recording medium.

Another object of the present invention is to provide a reproducing apparatus for reproducing a rotary recording medium recorded with signals in the above described manner, capable of obtaining a fine normal reproduction picture and reproduced normal audio signal by causing the reproducing element to scan over the track in accordance with the instruction by the instruction signal, and also capable of obtaining a complete still reproduction picture by repeatedly reproducing the same track turn.

Other objects and further features of the present invention will be apparent from the following detailed description when read in conjunction with the accompanying drawings.

BRIEF DESCRIPTION OF THE DRAWINGS

FIG. 8 shows an example of a scanning locus of a reproducing element when obtaining a normal reproduction picture and reproduced normal audio signal.

DETAILED DESCRIPTION

Figure 1:
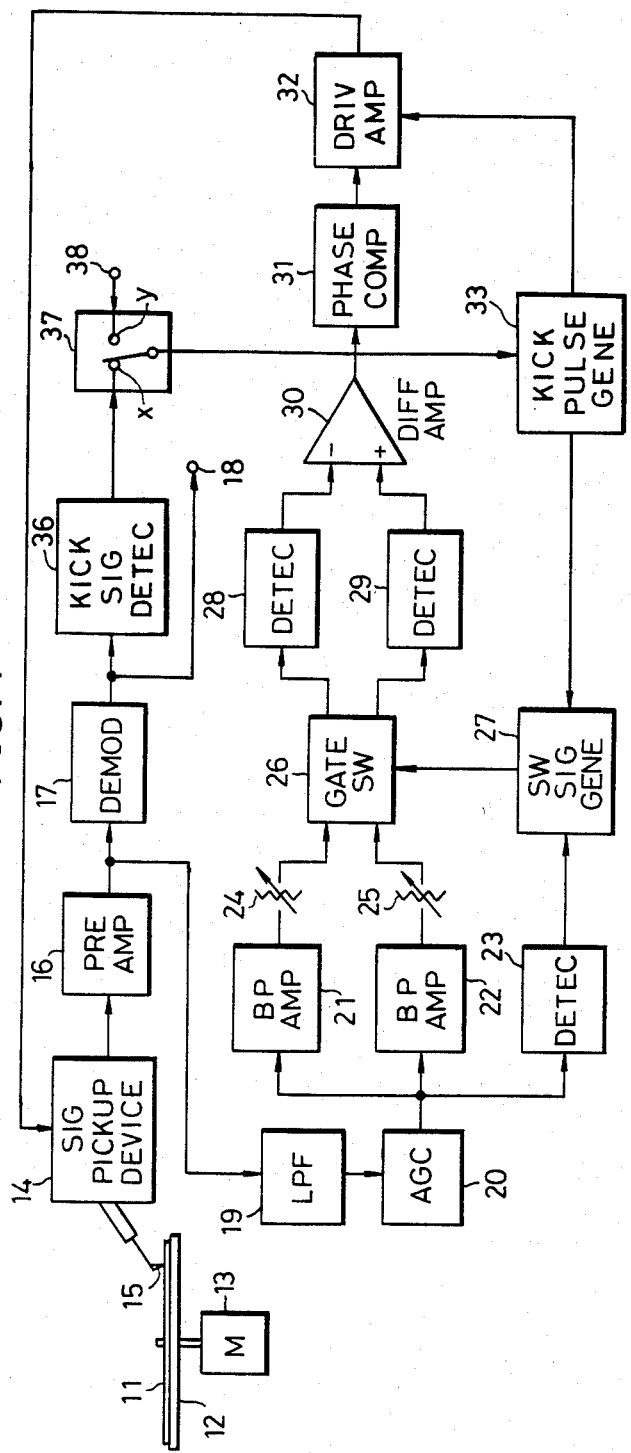
FIG. 1 is a systematic block diagram showing an embodiment of a rotary recording medium reproducing apparatus according to the present invention.

In FIG.1, a rotary recording medium (hereinafter simply referred to as a disc) 11 is placed onto a turntable 12. The disc 11 is rotated at a rotational speed of 900 rpm, for example, together with the turntable 12, by a motor 13. A signal pickup device 14 comprises a reproducing stylus 15 as a pickup reproducing element. Upon normal reproduction, this signal pickup device 14 is moved intermittently. For example, the reproducing stylus 15 is moved by thirty-two track pitches every time the reproducing stylus 15 reproduces thirty-two tracks on the disc 11 in one direction. In addition, upon still picture reproduction, the signal pickup device 14 is stopped from being moved. The reproducing stylus 15 relatively scans over the rotating disc 11, and accurately scans over a spiral track formed on the disc 11, according to a tracking error signal which will be described hereinafter.

Figure 2:
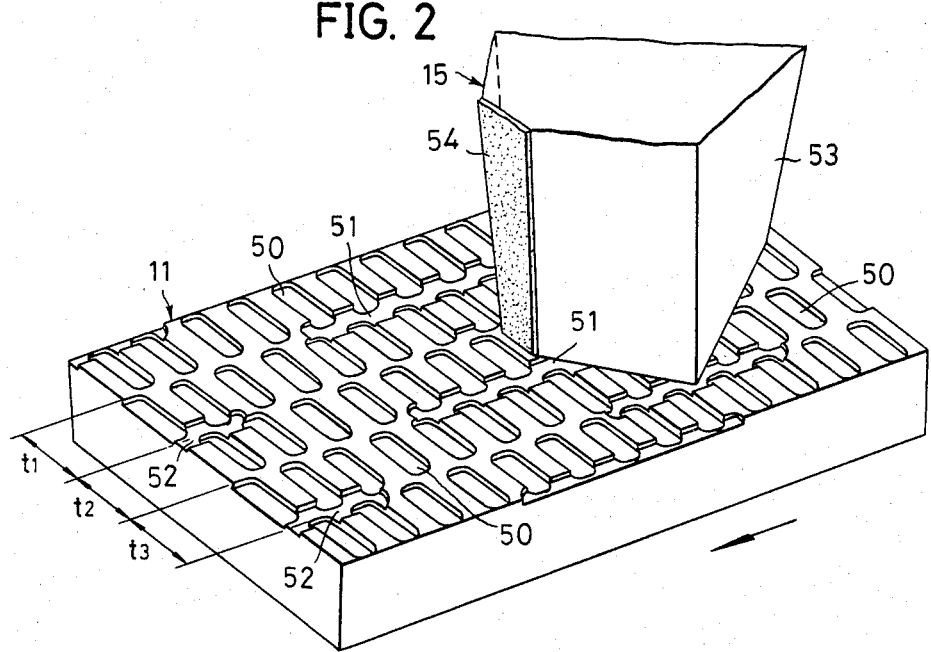
FIG. 2 is a perspective view, in an enlarged scale, showing a part of a rotary recording medium together with a tip end part of a reproducing stylus.

A main information signal comprising a video signal and an audio signal is recorded on a spiral track as a frequency-modulated signal, with pits formed on the disc 11 according to the information contents of the signal. One part of this track is shown in an enlarged scale in FIG. 2. In FIG. 2, track turns of a single continuous spiral track, corresponding to each revolution of the disc 11, are designated by t1, t2, t3, . . . Each track turn is constituted by the formation of pits 50 of a main information signal along a plane track path and has no stylus guide groove formed therein. With respect to one track turn tl, in every horizontal scanning period (1H) at a position corresponding to the horizontal blanking period, pits 51 of a first reference signal fp1 are formed on one lateral side of the track as viewed in the track path direction. Pits 52 of a second reference signal fp2 are formed on the other side of the track.

At an intermediate position between the centerlines of adjacent track turns, only pits of either one kind of the pits 51 and 52 of the above reference signals fp1 and fp2 are formed, and moreover, with respect to one track, the sides on which the pits 51 and 52 are formed are alternated for every track turn. That is, if the pits 51 and 52 are respectively formed on the right and left sides of one track turn, for example, the pits 52 and 51 will respectively be formed on the right and left sides of each of the adjacent track turns.

The tip end of the reproducing stylus 15 has a shape shown in FIG. 2. The reproducing stylus 15 is constituted by a stylus structure 53 having a disc tracing surface which has a width greater than a track width, and an electrode 54 fixed to the rear face of the stylus structure 53. As the reproducing stylus 15 traces along a track on the disc 11 rotating in a direction indicated by an arrow, the main information signal recorded thereon by the formation of pits is reproduced as variations in the electrostatic capacitance between the surface of the disc 11 and the electrode 54 of the reproducing stylus 15.

Figure 3:
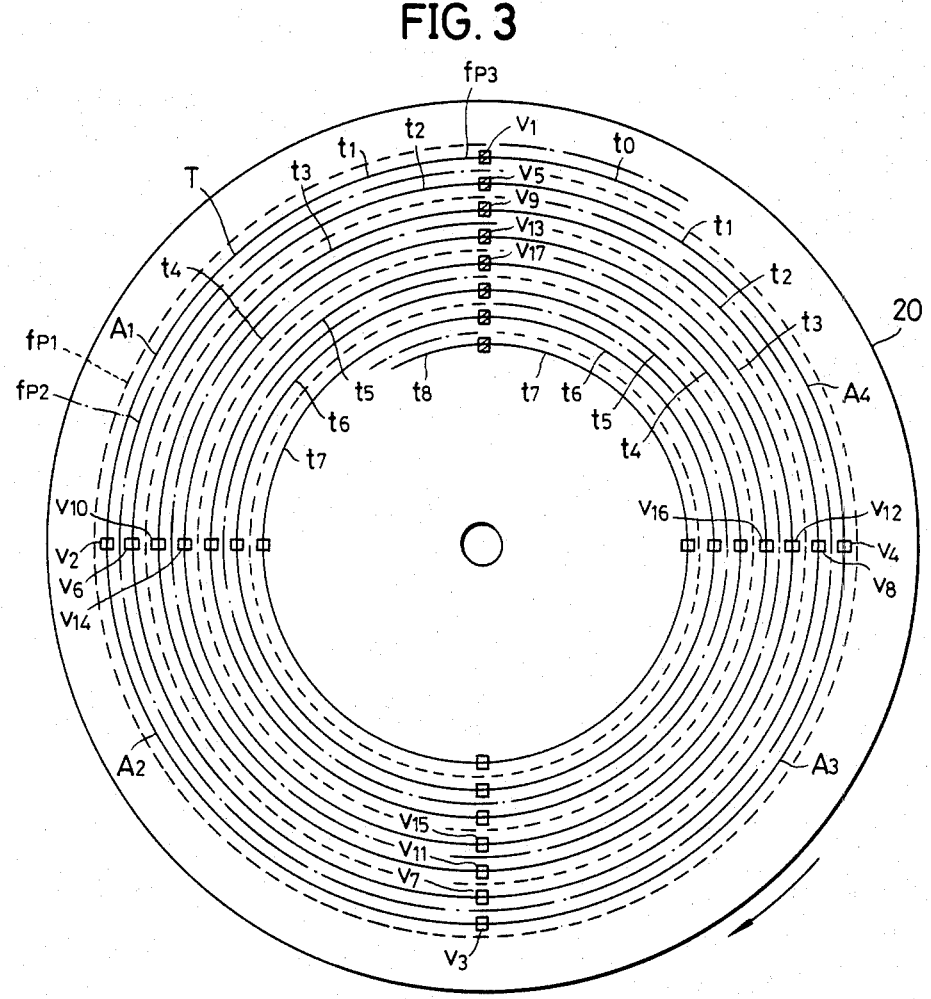
FIG. 3 shows a track pattern on the rotary recording medium.

On the disc 11, as indicated in FIG. 3, the main information signal is recorded along a spiral track T for four fields, for one revolution of the disc. In FIG. 3, the tracks of the reference signal fp1 is shown by dotted lines while the reference signal fp2 is shown by one-dot chain lines. The positions of the vertical synchronizing signals of respective fields are designated by reference characters V1, V2, V3, . . . , and the successive track parts corresponding to one revolution of the disc of a single spiral track T is designated by track turns t1, t2, t3, . . . Furthermore, a third reference signal fp3 is recorded at the starting end positions V1, V5, V9, . . . of each of the track turns t1, t2, t3, . . . , that is, at positions where the reference signals fp1 and fp2 change over, for a 3H period.

The main information signal is a frequency division multiplexed signal of a video signal and a frequency-modulated audio signal, multiplexed with a kick instruction signal which will be described hereinafter. A frequency-modulated signal obtained by frequency-modulating a single carrier by this main information signal, is recorded on the spiral track T on the disc 11 as the above described pits 50. The above first, second, and third reference signals fp1, fp2, and fp3 are burst signals respectively having mutually different frequencies, and occupy a frequency band lower than the frequency band of the above frequency-modulated signal.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level.

The reproduced signal comprises the frequency-modulated signal reproduced from the spiral track T, and the first and second reference signals fp1 and fp2 reproduced from tracks on both sides of the track T. Further, the third reference signal fp3 is reproduced instead of the first and second reference signals fp1 and fp2 for every revolution of the disc 11.

The resulting output of the preamplifier 16, is demodulated into the original main information signal by a demodulator 17 and is obtained as an output through an output terminal 18.

The output signal of the preamplifier 16 is supplied to a lowpass filter 19 wherein the reference signals fp1, fp2, and fp3 are separated. The output reference signals pass through an automatic gain control circuit 20, and are respectively supplied to bandpass amplifiers 21 and 22, and detector 23. Here, the bandpass amplifiers 21 and 22 respectively have characteristics to frequency-select and amplify only the respective frequencies of the reference signals fp1 and fp2. The reference signals fp1 and fp2 respectively obtained from the bandpass amplifiers 21 and 22 are respectively adjusted of the level at level adjustors 24 and 25, and then supplied to first and second input terminals of a gate switching circuit 26. The detector 23 frequency-selects the reference signal fp3 and generates an envelope detection output. The detector 23 self-generates the reference signal fp3 even if the reference signal fp3 is not reproduced due to dropout and the like, and the envelope detection output signal is supplied to a switching signal generator 27.

The gate switching circuit 26 is switched by a switching signal from the switching signal generator 27. For example, during the high-level period of the switching signal, the respective output signals of the bandpass amplifiers 21 and 22 are separately applied to respective input terminals of detectors 28 and 29. On the other hand, during the low-level period of the switching signal, the respective output signals of the bandpass amplifiers 21 and 22 are separately applied to respective input terminals of the detectors 29 and 28.

The polarity of the switching signal from the switching signal generator 27 is reversed with an incoming detection signal from the detector 23 or a kick pulse (excluding an incoming kick pulse during reproduction of the reference signal fp3) from a kick pulse generator 33 which will be described hereinafter. An envelope detection output of a tracking signal reproduced from a track on the outer side of the track which is to be reproduced, is thus obtained from the detector 28. Moreover, an envelope detection output of a tracking signal reproduced from a track on the inner side of the track which is to be reproduced, is obtained from the detector 29. These envelope detection outputs of the detectors 28 and 29 are respectively supplied to a differential amplifier 30 provided in a succeeding stage. A tracking error signal having a polarity in accordance with the direction of the tracking error and having a level in accordance with the tracking error quantity, is obtained from the differential amplifier 30. This tracking error signal is supplied to a driving amplifier 32 through a phase compensation circuit 31, and converted into a desired driving voltage. The driving voltage thus obtained, is applied to tracking coils within the signal pickup device 14, to control the signal pickup device 14. Accordingly, the reproducing stylus 15 is moved along the radial direction of the disc 11 with appropriate direction and quantity, so that the tracking error becomes zero and the reproducing stylus 15 accurately scans over the spiral track T on the disc 11.

On the other hand, the video signal within the main information signal which is demodulated and obtained from the demodulator 17, is supplied to a kick instruction signal detector 36. As will be described hereinafter, a kick instruction signal for forcibly shifting the reproducing stylus 15 to another track along the radial direction of the disc 11, is multiplexed within a predetermined 1H period in a specific vertical blanking period of the video signal. The kick instruction signal detector 36 detects the above kick instruction signal detector 36 detects the above kick instruction signal, and discriminates the existance or nonexistence of kick and the kicking direction. If a kick exists as a result of the discrimination, that is, if a kick operation is to be performed, for example, a detection signal having a polarity in accordance with the kicking direction is supplied to a contact x of a switch 37. The switch 37 is connected to the contact x only upon normal reproduction of the disc according to the present invention. In this connection state of the switch 37, the detection signal from the kick instruction signal detector 36 to the kick pulse generator 33. On the other hand, upon still picture reproduction of the disc according to the present invention or reproduction of a conventional disc in an arbitrary mode, the switch 37 is connected to a contact y. In this connection state of the switch 37, an incoming reproducing mode signal to a terminal 38 is supplied to the kick pulse generator 33.

Next, description will be given with respect to the disc according to the present invention.

In the recording system (not shown), the recorded audio signal is frequency-modulated and then mixed and multiplexed with the video signal and the kick instruction signal. The audio signal which is to be recorded is divided into units of one field period, and the divided audio signal is re-arranged in a predetermined order and composed in a time-series manner, as will be described hereinafter, before being recorded onto a magnetic tape. The signal reproduced from this magnetic tape is used as the recorded audio signal. A magnetic recording and reproducing apparatus (video tape recorder), a television camera, movie films, and the like can be used as the source of the above video signal. The recorded audio signal is frequency-modulated so that the audio signal exists in a frequency band higher than that of the video signal.

Figure 4:
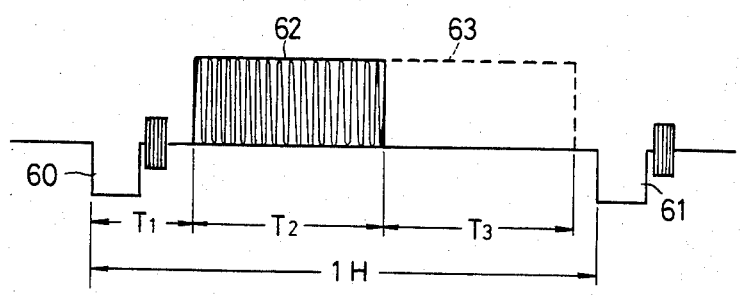
FIG. 4 is a graph showing the waveform of an example of a kick instruction signal recorded on the rotary recording medium.

FIG. 4 shows the waveform of a video signal part wherein the kick instruction signal is multiplexed. In FIG. 4, horizontal synchronizing signals 60 and 61 are tenth and eleventh horizontal synchronizing signals, for example, transmitted continuing to an equalization pulse succeeding a vertical synchronizing pulse, and are positiond within the vertical blanking period. It will be assumed that the kick instruction signal is a 2-bit signal, in order to simplify the explanation. The first bit of the kick instruction signal is transmitted in a period T2. This period T2 starts from a point where a period T1 has elapsed from a leading edge of the horizontal synchronizing signal 60. On the other hand, the second bit of the kick instruction signal is transmitted in a period T3 succeeding the transmission of the above first bit. Normally, the periods T2 and T3 are the same.

The first bit of the kick instruction signal indicates the existence or non-existence of the kick. If the first bit is "1", that is, when a single frequency signal of approximately 500 kHz exists, this indicates that the kick operation is to be performed. On the other hand, if the first bit is "0", this indicates that no kick operation is to be performed. The second bit of the kick instruction signal indicates the kicking direction. For example, a kick in the outer peripheral direction of the disc is indicated by "1", and a kick in the inner peripheral direction of the disc is indicated by "0". Hence, because the kick operation is not performed when the first operation is not performed when the first bit is "0", the second bit is always set to "0" in this state. As a result, the kick instruction signal is not recorded within the vertical blanking period wherein the kick operation is not performed. In the waveform shown in FIG. 4, a single frequency signal exists in the first bit as indicated by a numeral 62, and no signal exist in the second bit as indicated by a numeral 63. Therefore, this waveform indicates a kick instruction signal for performing a kick operation in the inner peripheral direction of the disc.

The above mixed and multiplexed signal is frequency-modulated, and this frequency-modulated mixed and multiplexed signal is recorded onto the track T of the disc 11 as the main information signal. The recording of the main information signal is performed by a recording system such as that disclosed in the U.S. Pat. No. 4,315,283.

The video signal recorded onto the disc 11 is a video signal of the same field or the same picture frame for one revolution of the disc. However, the recording method of the audio signal depends on the kind of video signal and video signal source. Hence, description will be given hereinafter with respect to each case. In the following description, it is assumed that the disc 11 is rotated at a rotational speed of 900 rpm, and that the field frequency of the reproduced video signal is 60 Hz, in order to simplify the description.

Figure 5:
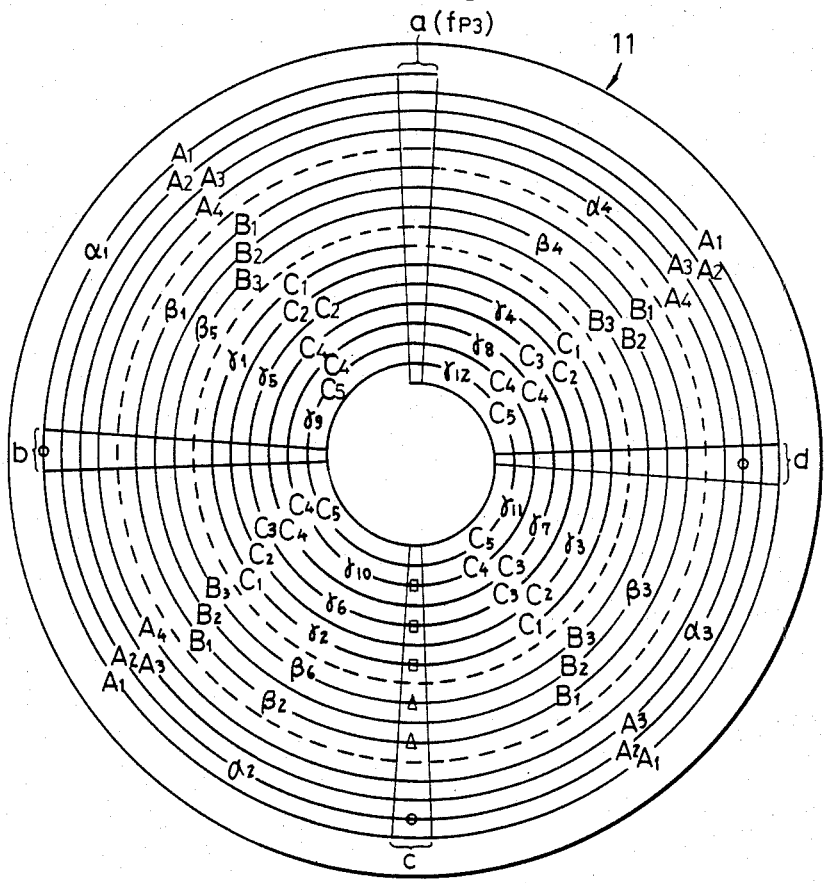
FIG. 5 shows a track pattern for explaining a first embodiment of a recording signal content to be recorded on the rotary recording medium.

If the video signal source is a VTR or a television camera, the video signal of the first field, of the reproduced or picked up video signal having the field frequency of 60 Hz, is repeatedly reproduced four times for one revolution of the disc (in this case, equal to four field periods). The video signal of the succeeding field is then repeatedly reproduced four times, for one revolution of the disc. Thereafter, the video signal of each field is similarly repeatedly reproduced four times, for each revolution of the disc. In FIG. 5, reference characters A1, A2, A3, and A4 respectively indicate the video signal recording positions of one field for the above case. Here, the subscripts to the reference character "A" indicate the order of the fields.

On the other hand, the audio signal is divided into one-field periods, and the divided audio signal parts are reproduced by a tape recorder as described above. As indicated by $\alpha1, \alpha2, \alpha3, \alpha4, \ldots$ in FIG. 5, the divided audio signal parts are recorded for every five field period (for every $1\frac{1}{4}$ revolutions of the disc).

Further, when recording the output video signal from the VTR or the television camera, the above kick instruction signal is recorded in five field periods at three vertical blanking period recording parts b, c, and d, from among the vertical blanking period recording parts a, b, c, and d of the video signal excluding the vertical blanking period recording part a whereat the third reference signal fp3 is also recorded. In FIG. 5, circular marks indicate the kick instruction signal recording positions. In this case shown in FIG. 5, the kick instruction signal contains instruction information to kick in the forward direction (in this case, towards the inner peripheral direction of the disc). In FIG. 5, and FIGS. 6, 7, and 8 which will be described hereinafter, only the track T is shown.

Next, when recording a video signal from a movie film having thirty pictures (frames) per second, the video signal of one picture is repeatedly recorded for a total of four times for one revolution of the disc. The video signal of the succeeding picture is repeatedly recorded four times for one revolution of the disc. Thereafter, the video signal of each picture is similarly repeatedly recorded four times for each revolution of the disc. In FIG. 5, reference characters B1, B2, and B3 indicate the video signal recording positions in this case. The subscripts to the reference character "B" indicates the order of the picture.

On the other hand, upon recording of the video signal from the movie film having thirty pictures per second, the audio signal is divided into one field periods, to obtain divided audio signal parts $\beta1, \beta2, \beta3, \beta4, \beta5, \beta6, \ldots$ The divided audio signal parts $\beta1$ and $\beta2$ are continuously recorded from a position succeeding the vertical blanking period recording part a, and thereafter, the divided audio signal part $\beta3$ is recorded after four field periods have elapsed. The divided audio signal parts $\beta4$, $\beta5$, and $\beta6$ are then recorded continuing to the above divided audio signal part $\beta3$. Other audio signal parts are similarly recorded thereafter as shown in FIG. 5. Accordingly, in this case, the audio signal divided into four field periods, may be recorded twice, repeatedly. Furthermore, in this case, the kick instruction signal containing instruction information for kicking in the inner peripheral direction of the disc is only recorded at the vertical blanking period recording part c, for every two revolution period of the disc, as indicated by a triangular marks in FIG. 5.

Description will now be given with respect to a case where the video signal from a movie film having twenty-four pictures (frames) per second, is to be recorded. In this case, there are two methods for recording the video signal. In one method, the video signal of one picture of the movie film is repeatedly recorded for a total of four times in one field periods. Then the video signal of the succeeding picture is repeatedly recorded for a total of six times in one field periods. This recording operation is similarly continued thereafter. In FIG. 5, reference characters C1 through C5 respectively indicate the recording positions of the video signal of each picture, recorded by the above first recording method. The subscripts to the reference character "C" indicate the order of the pictures. As clearly seen from FIG. 5, by this first recording method, there are tracks wherein the video signal of the same picture is repeatedly recorded for a total of four times in one track turn, and there are tracks wherein video signals of two different pictures are repeatedly recorded twice for one track turn. Therefore, upon reproduction, although a completely still reproduction picture cannot be obtained from all the tracks, fine normal reproduction picture can be obtained according to the known 2-3 (or 3-2) pull down system. On the other hand, in a second recording method, the video signal of each picture in the video signal reproduced at a rate of twenty-four pictures per second, is repeatedly recorded for a total of four times in one field periods. According to this second recording method, the video signal of the same picture is repeatedly recorded for a total of four times in one track turn. Hence, although a completely still reproduction picture can be obtained, slight inconveniences are introduced upon normal reproduction.

However, the recording method for recording the audio signal and the kick instruction signal upon recording of the video signal of the movie film having twenty-four pictures per second, is the same for the above first and second recording methods for recording the video signal. That is, with respect to the audio signal, the audio signal is divided in units of one field periods to obtain divided audio signal parts $\gamma1, \gamma2, \ldots, \gamma11, \gamma12, \ldots$ Among these divided audio signal parts, the first and second divided audio signal parts $\gamma1$ and $\gamma2$ are continuously recorded succeeding the vertical blanking period recording part a. Then, the third through sixth divided audio signal parts $\gamma3$ through $\gamma6$ are successively recorded after four field periods have lapsed. Thereafter, the recording of the audio signal is similarly continued. Accordingly, the divided audio signal parts $\gamma1$ through $\gamma12$ are arranged and recorded at positions shown in FIG. 5.

The kick instruction signal containing instruction information for kicking in the inner peripheral direction of the disc is recorded at positions indicated by rectangular marks in FIG. 5, that is, at the vertical blanking period recording part c for every two revolution periods of the disc.

Hence, according to the present embodiment of the invention, video signals from a total of three kinds of video signal sources are time serially recorded together with the audio signal on one recording surface of the disc, without introducing video information dropout. The video signal of the same video information (same field or same picture) desirably obtained as a still picture, is repeatedly recorded four times in a part of or all the tracks formed for every revolution of the disc. In addition, the audio signal at least divided into divided audio signal parts in units of field periods according to the scanning locus of the reproducing element upon obtaining of the normal reproduction picture, is successively arranged and recorded. Furthermore, the kick instruction signal containing instruction information for forcibly shifting the reproducing element in the forward direction, is recorded at the vertical blanking period c in each track with predetermined field periods, and is not recorded at the vertical blanking period a. Moreover, if the video signal source is the VTR or the television camera, the kick instruction signal is also recorded at the vertical blanking periods b and d with perdetermined field periods.

In a case where a video information part which is to be obtained as a still picture among a series of video information only exists partially, the video information between one video information part which is to be obtained as the still picture and the next video information part which is to be obtained as the still picture, is recorded as normal pictures as in the conventional case. In this case, the above kick instruction signal is not recorded in the range wherein the video information is recorded as normal pictures.

Figure 6:
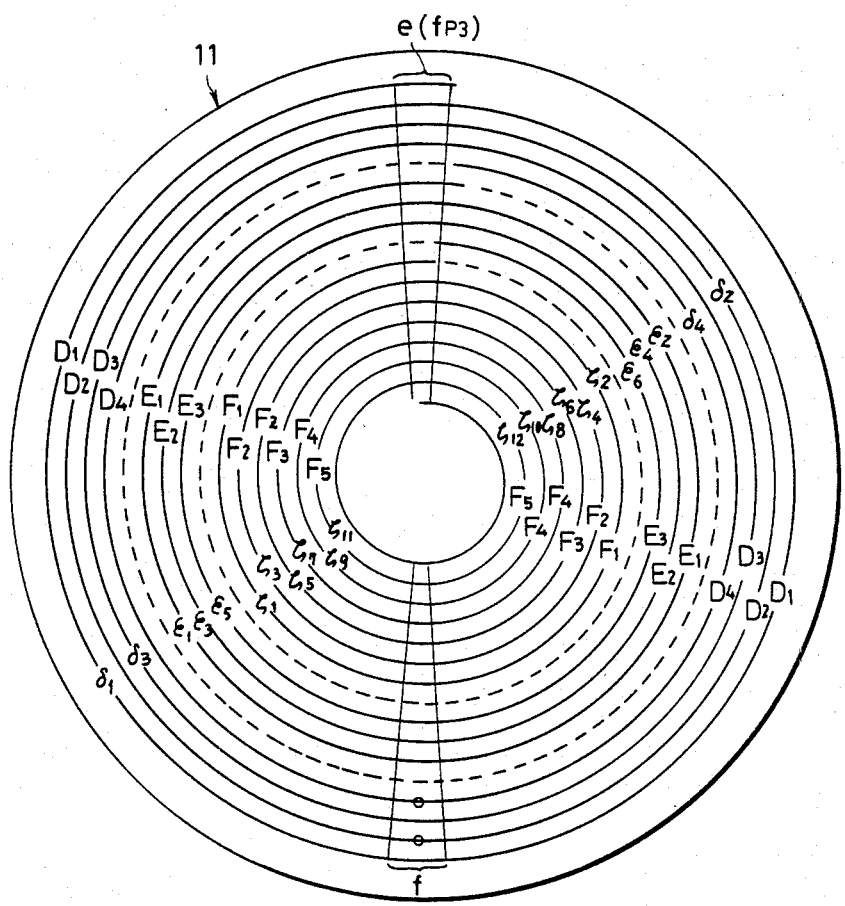
FIG. 6 shows a track pattern for explaining a second embodiment of a recording signal content to be recorded on the rotary recording medium.

Next, description will be given with respect to a second embodiment of a disc according to the present invention. FIG. 6 diagrammatically shows signal recording positions on the second embodiment of the disc. The vertical blanking period recording parts are indicated by e and f, and these vertical blanking period recording parts are arranged at mutually opposing positions on the disc. The above third reference signal fp3 is also recorded within the vertical blanking period recording part e. Accordingly, in the present embodiment, the video signal is recorded at a rate of two fields for one track turn of the disc.

One field periods recorded with the output video signal (having a field frequency of 60 Hz) of the VTR or television camera, are respectively indicated by D1 through D4 in FIG. 6. The subscripts to the reference character "D" indicates the order of the fields. Thus, the video signal of the same field is repeatedly recorded twice in two field periods in one track turn. Here, the audio signal is divided in units of one field periods and is recorded at positions as shown by divided audio signal parts δ1 through δ4. In this case, the audio signal part for two field periods may be repeatedly recorded twice.

As indicated by black circular marks in FIG. 6, the kick instruction signal is recorded at the vertical blanking period recording part f for every two revolution periods of the disc.

If the video signal from the movie film reproduced at the rate of thirty pictures per second is to be recorded after recording the video signal having the field frequency of 60 Hz and the audio signal, the video signal from the movie film reproduced at the rate of thirty pictures per second is repeatedly recorded twice as indicated by E1 through E3 in FIG. 6. As in the conventional case, the audio signal is normally recorded as indicated by ε1 through ε6. Further, if the video signal from the movie film reproduced at the rate of twenty-four pictures per second is to be recorded thereafter, the video signal of one picture is repeatedly recorded twice for two field periods, the video signal of the succeeding picture is repeatedly recorded three times for three field periods, and the recording is similarly performed repeatedly thereon. Upon recording of the video signal from the movie film reproduced at the rate of twenty-four pictures per second, the audio signal is normally recorded as in the conventional case as indicated by ζ1 through ζ12 in FIG. 6.

As described above, in the disc wherein the video signal is recorded at a rate of two fields for one track turn, the audio signal is divided into units of one field periods and recorded by a method different from the recording method of the conventional disc, and the kick instruction signal is also recorded, only upon recording of the video signal having the field frequency of 60 Hz.

On the other hand, in other cases, the audio signal is recorded by the same recording method as in the conventional case. In addition, the video signal is repeatedly recorded twice in the track formed for one revolution of the disc. However, as described above, in the case of the video signal from the movie film reproduced at the rate of twenty-four pictures per second, the video signal may be recorded in two fields and three fields as indicated by F1 through F5 in FIG. 6.

Figure 7:
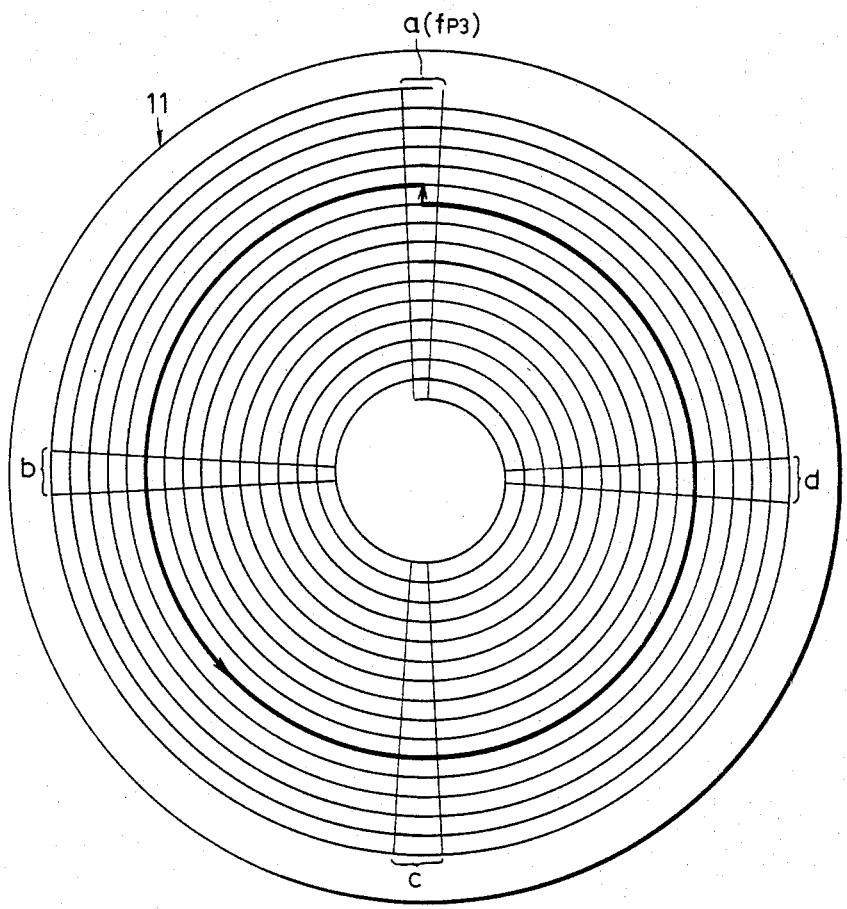
FIG. 7 shows an example of a scanning locus of a reproducing element upon still picture reproduction of the rotary recording medium shown in FIGS. 5 or 6.

Next, description will be given with respect to the operation of the reproducing apparatus for reproducing the above disc, upon still picture reproduction and normal reproduction. First, upon still picture reproduction, the switch 37 shown in FIG. 1 is connected to the contact y. Thus, a still picture reproduction mode signal from the terminal 38 is supplied to the kick pulse generator 33, through the switch 37. As a result, the kick pulse generator 33 generates a kick pulse for forcibly shifting the reproducing stylus 15 in the reverse direction (outer peripheral direction of the disc) by one track pitch for one revolution period of the disc 11. This kick pulse thus generated, is applied to the tracking coils within the signal pickup device 14, through the driving amplifier 32, to shift the reproducing stylus 15 in the outer peripheral direction of the disc every time the third reference signal fp3 is reproduced. Moreover, by maintaining the polarity of the output switching signal of the switching signal generator 27, the reproducing stylus 15 is shifted to the outer peripheral direction by one track pitch within the vertical blanking period a or e as in the conventional case, even if the disc is of the kind recorded as shown in FIGS. 5 or 6, and the reproducing stylus 15 accordingly repeatedly reproduces the same track. FIG. 7 shows a track scanning locus upon still picture reproduction of the disc shown in FIG. 5. Because the video signal of the same field or the same picture is repeatedly recorded in each track turn of the track part recorded with the video signal having the field frequency of 60 Hz or the video signal of the movie film reproduced at the rate of thirty pictures per second, a completely still reproduction picture having a field frequency of 60 Hz can be obtained by repeatedly reproducing the above same track turn. In addition, in the case of the disc shown in FIG. 5 or 6, there are tracks repeatedly recorded with the video signal of the same picture in the track part recorded with the video signal of the movie film reproduced at the rate of twenty-four picturs per second. Upon reproduction of such a track, it is possible to obtain a completely still picture having a field frequency of 60 Hz.

During this still picture reproduction, the audio signal is generally not reproduced. Moreover, the feeding of the signal pickup device 14 including the reproducing stylus 15 is stopped.

Next, description will be given on the operation of the reproducing apparatus upon normal reproduction performed with respect to the disc shown in FIG. 5. During normal reproduction, the switch 37 is connected to the contact x. Thus, the output detection signal of the kick instruction signal detector 36 is applied to the kick pulse generator 33 through the switch 37. Here, in the case of the disc shown in FIG. 5, the kick instruction signal for kicking in the inner peripheral direction of the disc is recorded at vertical blanking periods indicated by the circular, triangular, and rectangular marks. Accordingly, the reproducing stylus 15 scans over a scanning locus indicated by a thick solid line in FIG. 8.

Therefore, the track part recorded with the video signal having the field frequency of 60 Hz, corresponds to the scanning locus of the reproducing stylus 15 during the conventional quadruple-speed reproduction. Accordingly, with respect to the video signal, the video signal in each field is successively reproduced in an order A1→A2→A3→A4→..., and a complete normal reproduction picture can be obtained. On the other hand, with respect to the audio signal, the reproduced normal audio signal can be obtained because the divided audio signal parts are successively reproduced in the divided order α1→α2→α3→α4→... In addition, upon normal reproduction of the track part recorded with the video signal of the movie film reproduced at the rate of thirty pictures per second, the scanning locus corresponds to the scanning locus of the conventional double-speed reproduction as shown in FIG. 8. Hence, with respect to the video signal, the video signal of the same picture is repeatedly reproduced twice in the order B1→B1→B2→B2→B3→B3→..., and normal reproduction picture having the field frequency of 60 Hz is accordingly obtained. On the other hand, with respect to the audio signal, the reproduced normal audio signal is obtained because the audio signal is reproduced in the divided order β1→β2→β3→β4→β5→β6→...

The scanning locus of the part recorded with the video signal of the movie film reproduced at the rate of twenty-four pictures per second, coincides with the scanning locus of the conventional double-speed reproduction as shown in FIG. 8. Thus, with respect to the video signal, one picture is reproduced for two fields and the succeeding picture is reproduced for three fields, and this reproducing operation is repeated to carry out reproduction according to the known 2-3 pull down system. In this case, the video signal is reproduced in the order C1→C1→C2→C2→C2→C3→C3→C4→C4→C4→C5→C5→C6→..., and the normal reproduction picture having the field frequency of 60 Hz is accordingly obtained. On the other hand, the audio signal is reproduced in the same order as the divided order, that is, in the order γ1→γ2→..., and the reproduced normal audio signal is thus obtained.

During normal reproduction of the disc shown in FIG. 6, the kick instruction signal is only recorded at positions indicated by black circular marks in the track part recorded with the video signal having the field frequency of 60 Hz and the kick instruction signal is reproduced therefrom. In this case, the scanning locus becomes the same as the scanning locus of the conventional double speed reproduction. On the other hand, the track part recorded with the video signal of the movie film reproduced at the rate of thirty or twenty-four pictures per second is not recorded with the kick instruction signal. Hence, in this case, the scanning locus becomes the same as the conventional scanning locus of the normal reproduction in which the reproducing stylus is not shifted. Therefore, normal reproduction picture and reproduced normal audio signal can thus be obtained.

Upon normal reproduction of the disc according to the present invention shown in FIGS. 5 and 6, the kick instruction signal is reproduced, and the kick control is performed in accordance with the reproduced kick instruction signal. Accordingly, even if recorded video signals of various kinds of signal sources exist together on the same recording surface of the disc, or even if tracks repeatedly recorded with the video signal of the same picture or the same field and tracks normally recorded exist together in the tracks recorded on the disc, a predetermined scanning locus in accordance with the recorded signal is accurately obtained, without introducing kicks at erroneous positions. Therefore, fine normal reproduction picture can always be obtained. Here, with respect to a disc having a reproducing time of sixty minutes for one recording side, the reproducing time falls in a range between fifteen minutes and close to sixty minutes.

The present invention is not limited to the above described embodiments. For example, the video signal of the movie film reproduced at the rate of twenty-four pictures per second may be repeatedly recorded for eight fields with respect to one picture, and the video signal may be recorded for four fields with respect to another picture. In this case, normal reproduction picture can be obtained according to a predetermined pull down system by using the scanning loci of the conventional double-speed and quadruple-speed reproduction. In addition, the present invention can also be applied to a disc which is reproduced with a field frequency of 50 Hz. The present invention can similarly be applied to a disc recorded with a plurality of fields such as eight fields for one revolution of the disc. Moreover, although the above embodiments were described for the case where the recorded signals are reproduced by the reproducing stylus 15, the reproducing element is not limited to the above reproducing stylus. For example, a light beam may be used so that the recorded signals are reproduced by reading the light intensity variations of reflected light or transmission light from the disc.

Further, the present invention is not limited to these embodiments, but various variations and modifications may be made without departing from the scope of the present invention.

What is claimed is:

1. A rotary recording medium to be played on a reproducing apparatus having a reproducing element for reproducing recorded signals from the rotary recording medium, said rotary recording medium having a spiral track made up of a plurality of track turns on which a video signal, a kick instruction signal, and an audio signal are recorded, said video signal being recorded on the track turns in terms of units, and the video signal of an identical unit being repeatedly recorded in one track turn whereby a still picture reproduction is performed from the track turn when the reproducing element repeatedly scans over the same track turn, and whereby a normal reproduction is performed from the track turns which are scanned by the reproducing element along a predetermined scanning locus, said kick instruction signal being modulated and causing the reproducing element to shift from one track turn to another track turn, and said kick instruction signal being recorded during vertical blanking intervals of the video signal with an interval which is equal to a predetermined number of units of the video signal and is in accordance with the kind of video signal program source from which the video signal is supplied, said audio signal being made up of divided audio signal parts each having a duration of one unit of the video signal, said divided audio signal parts being distributively recorded on the track turns so that a continuous audio signal is reproduced by the reproducing element as the reproducing element scans over the track turns along said predetermined scanning locus during the normal reproduction.

2. A rotary recording medium as claimed in claim 1 in which the video signal of the same unit is a television video signal of the same field.

3. A rotary recording medium as claimed in claim 1 in which the video signal of the same unit is a video signal corresponding to the same picture (frame) of a movie film.

4. A rotary recording medium as claimed in claim 1 in which said spiral track includes track turns on which a video signal supplied from a first video signal source is recorded and track turns on which a video signal supplied from a second video signal source is recorded.

5. A reproducing apparatus for reproducing recorded signals from a rotary recording medium, said rotary recording medium having a spiral track made up of a plurality of track turns on which a video signal, a kick instruction signal, and an audio signal are recorded, said video signal being recorded on the track turns in terms of units and the video signal of an identical unit being repeatedly recorded in one track turn, said kick instruction signal being recorded during vertical blanking intervals of the video signal with a predetermined interval, said audio signal being made up of divided audio signal parts each having a duration of one unit of the video signal, said divided audio signal parts being distributively recorded on the track turns, said reproducing apparatus comprising:

reproducing means including a reproducing element for scanning over said spiral track on the rotary recording medium and for reproducing the recorded signals from said spiral track, said predetermined period with which said kick instruction signal is recorded on the rotary recording medium being equal to a predetermined number of units of the video signal and being in accordance with the kind of video signal program source from which the video signal is supplied;

detecting circuit means for detecting said kick instruction signal from among the signals reproduced by said reproducing means;

kick pulse generator means for generating a kick pulse responsive to the kick instruction signal supplied from said detecting circuit means, said kick pulse causing said reproducing element to shift from one track turn to another track turn, said reproducing element repeatedly scanning over the same track turn during a still picture reproduction mode and scanning over the track turns along a predetermined scanning locus in accordance with the kick pulse during a normal reproduction mode; and switch means for selectively suppplying the output signal of said detecting circuit means to said kick pulse generator means during a normal reproduction mode, and for supplying a still picture reproduction mode signal to said kick pulse generator means during a still picture reproduction mode, said reproducing means reproducing a continuous audio signal as said reproducing element scans over the track turns along the predetermined scanning locus during the normal reproduction mode.

6. A reproducing apparatus as claimed in claim 5 in which said kick pulse generator means generates a kick pulse having a waveform corresponding to a polarity of the output signal of the detecting circuit means, and the reproducing element being shifted in a direction determined by the waveform of the kick pulse during the vertical blanking interval.

* * * * *